United States Patent [19]

Bianchi

[11] Patent Number: 5,434,617
[45] Date of Patent: Jul. 18, 1995

[54] AUTOMATIC TRACKING CAMERA CONTROL SYSTEM

[75] Inventor: Michael H. Bianchi, Madison, N.J.

[73] Assignee: Bell Communications Research, Inc., Livingston, N.J.

[21] Appl. No.: 350,752

[22] Filed: Dec. 7, 1994

Related U.S. Application Data

[63] Continuation of Ser. No. 11,067, Jan. 29, 1993, abandoned.

[51] Int. Cl.⁶ .............................................. H04N 7/18
[52] U.S. Cl. ................................... 348/170; 348/169
[58] Field of Search ............... 348/143, 155, 169, 170, 348/171, 172, 211, 214; H04N 7/18

[56] References Cited

U.S. PATENT DOCUMENTS

| Patent # | Date | Inventor | Class |
|---|---|---|---|
| 3,652,790 | 3/1972 | Eberhardt | 358/125 |
| 3,699,248 | 10/1972 | McKechnie | 178/6.8 |
| 3,891,798 | 6/1975 | Marcus | 358/126 |
| 3,953,669 | 4/1976 | Saccomani et al. | 358/126 |
| 4,027,329 | 5/1977 | Coutta | 358/108 |
| 4,120,004 | 10/1978 | Coutta | 358/125 |
| 4,268,863 | 5/1981 | Los | 358/125 |
| 4,405,940 | 9/1983 | Woolfson et al. | 358/125 |
| 4,458,266 | 7/1984 | Mahoney | 348/155 |
| 4,851,905 | 7/1989 | Pryor | 358/125 |
| 4,951,137 | 8/1990 | Kisou et al. | 358/125 |
| 5,062,056 | 10/1991 | Lo et al. | 348/171 |
| 5,068,735 | 11/1991 | Tuchiya et al. | 358/209 |
| 5,086,480 | 2/1992 | Sexton | 348/171 |
| 5,091,781 | 2/1992 | An | 358/125 |
| 5,134,472 | 7/1992 | Abe | 348/155 |
| 5,150,426 | 9/1992 | Banh et al. | 348/155 |
| 5,164,827 | 11/1992 | Paff | 358/210 |
| 5,175,694 | 12/1992 | Amato | 358/125 |
| 5,196,929 | 3/1993 | Miyasaka | 348/169 |
| 5,243,418 | 9/1993 | Kuno et al. | 358/126 |

*Primary Examiner*—Tommy P. Chin
*Assistant Examiner*—Richard Lee
*Attorney, Agent, or Firm*—Leonard Charles Suchyta; James W. Falk

[57] ABSTRACT

Methodology and circuitry for automatically effecting electronic camera movement to track and display the location of a moving object, such as a person presenting a talk to an audience. A fixed spotting camera is used to capture a field of view, and a moving tracking camera with pan/tilt/zoom/focus functions is driven to the present location of the moving object. Information for driving the tracking camera is obtained with reference to the pixel difference between a current image and a previous image within the field of view. A tracking algorithm computes the information necessary to drive the tracking camera from these pixel differences as well as data relative to the field of view of the spotting camera and the present tracking camera position.

2 Claims, 8 Drawing Sheets

AUTOMATIC TRACKING CAMERA CONTROL SYSTEM

This application is a continuation of application Ser. No. 08/011,067, filed Jan. 29, 1993 now abandoned.

FIELD OF THE INVENTION

This invention relates generally to camera control systems and, more specifically, to a two-camera system which automatically tracks movement of an object in the image space under control of a tracking algorithm.

BACKGROUND OF THE INVENTION

Audio/visual presentations given in a corporate setting are seldom attended by as many people as would like to see and hear such presentations. It is often inconvenient to travel to where the talk is given and one must be free at the appointed hour. Televising talks over a video network and/or making the video tape available for later viewing are often viable alternatives for a corporation having many geographical-dispersed work locations.

Installation of commercial-grade television equipment in a large meeting room or auditorium can transform such a location into a simple and cost effective television studio. If the equipment is not overly elaborate nor difficult to operate, then only one person can do the work usually assigned to two or more trained personnel. As a result, it is economical and very convenient to record and telecast presentations made in that room so they can be seen and heard at other locations, and even at different times if desired.

One weakness of the one-operator system is that a person who walks around during their presentation can present a significant work load to the system operator who must keep up with the movement of the person. This extra work load becomes a distraction from the system operator's principal task of presenting the most appropriate image to the remote audience or to the recording medium.

The prior art is devoid of teachings and suggestions for a video system wherein a camera arrangement can track a presenter who paces and/or gesticulates, and thereby provides to the system operator another image which may be appropriately selected for immediate display or recording for later replay.

SUMMARY OF THE INVENTION

Instead of requiring the operator to follow the presenter by physically controlling the movement of the camera so as to make available an image at the system control console which may then be displayed to the audience or captured on a recording medium, the technique in accordance with the present invention effects camera movement automatically and the operator merely selects the display image as one of many that may be chosen for viewing.

Broadly, in accordance with the methodology of the present invention, a moving object is tracked within the field of view of an electronic camera system, which is illustratively composed of a fixed spotting camera and a movable tracking camera. In the methodology, images are sequentially generated by the electronic camera system and then stored as pixel representations during each of the scan intervals of the camera system. A sequence of pixel differences between pairs of images is then evaluated to produce pixel information indicative of movement of the object. From this pixel information, a set of camera frames is then computed wherein the camera frames are positioned to capture localized movement of the object within the field of view of the electronic camera system. Finally, each camera frame is imaged with the electronic camera system.

In one illustrative embodiment, the method includes, initially, a step of generating and storing an image, called the previous image, as captured by the camera system during a scan interval. Then, another image, called the current image, is captured during a subsequent scan interval. The difference between the current image and the previous image is evaluated on a per pixel basis to obtain pixel differences. The pixel differences are used to locate a bounding box which outlines or borders the region within the image of the spotting camera indicative of the movement by the object between the current and previous images. The dimensionality of the bounding box is then utilized to generate a tracking frame positioned on the moving object with the appropriate aspect ratio of the camera system. The actual camera frame displayed by the camera system is obtained with reference to the tracking frame, such as by enlarging the area of the tracking frame. Then the current image is generally stored as a previous image, and the cycle repeats, commencing with the capturing of a new current image.

The organization and operation of the invention will be better understood from a consideration of the detailed description of the illustrative embodiments thereof, which follow, when taken in conjunction with the accompanying drawing.

DETAILED DESCRIPTION

The basic characteristics of the operating environment where the automatic camera control system is used are as follows:

(1) the object being tracked, such as a person, is the only object likely to be moving in the range of potential scenes, except for pre-determined areas which will have motion but where such motion in isolation is not of interest;

(2) only one object is to be tracked, or multiple objects which generally are in motion simultaneously are to be tracked; and (3) failure to stay "on target" is not a serious flaw, provided it does not happen too often nor persist too long.

These characteristics then impose some limitations on the operating environment, expressed as:

(i) The background of the area of potential scenes must be highly static; for example, in the illustrative case, no drapes or plants constantly swaying, no windows or doorways that can see outside traffic.

(ii) Objects which may move but are not of interest must be well separated from the area where the tracked object moves from the camera's point-of-view. For instance, the members of the audience must be well separated from the area where a person giving the talk stands and moves.

(iii) Areas of potential scenes which may exhibit motion and where the tracked object may also move can be identified and marked with a Block Box. As an example, a person giving the talk may walk in front of a projection screen where slides are shown and changed.

Placement of the Camera System in a Room

Figure 1:
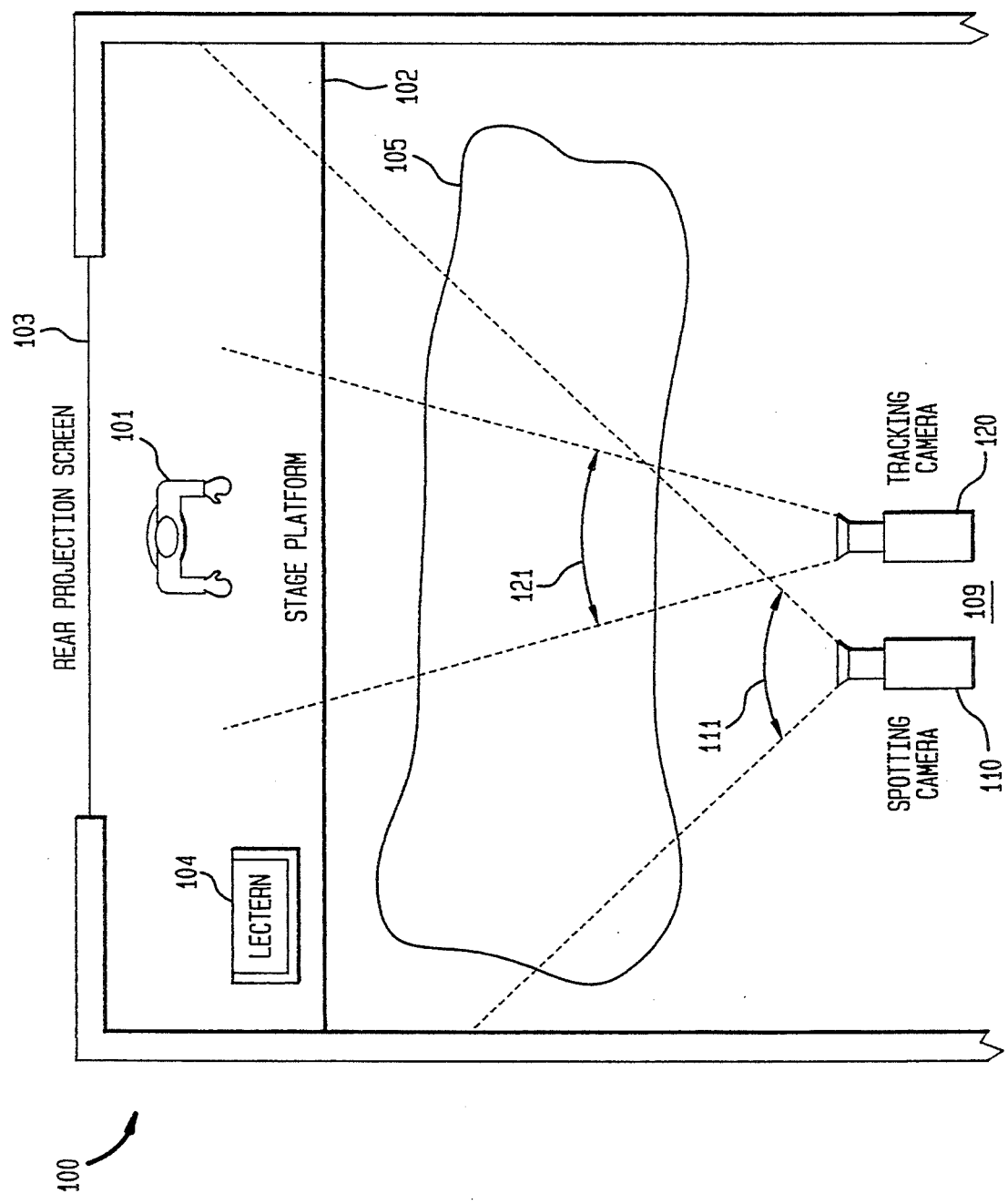
FIG. 1 depicts a typical environment in which the system in accordance with present invention may operate.

The diagram of FIG. 1 is an overhead view of room 100, typical of an environment where tracking camera system 109 in accordance with the present invention is used. Person 101—the object or target of interest—is standing in the center of stage platform 102, in front of projection screen 103, and is facing audience area 105. Two cameras compose the electronic camera tracking system 109, namely spotting camera 110 and tracking camera 120. Typically, camera system 109 is suspended from the ceiling of room 100.

Spotting camera 110 does not move and looks at the entire front of the room, as shown by the dotted lines emanating from camera 110 forming a solid viewing angle 111. Camera 110 does not pan, tilt, zoom or change focus.

Tracking camera 120 is remotely controllable and can be made to pan, tilt, zoom and focus by commands issued by a computer (not shown). These commands cause the image within the solid viewing angle 121, called the "tracking image," of the tracking camera to change and thereby tend to keep the moving person 101 in view. The focus function of the tracking camera may include an automatic focus capability.

The image captured within angle 111, called the "spotting image," determines the coverage of the system and hence the range of possible views which may be seen by tracking camera 120. If person 101 leaves the spotting image the tracking camera will not be able to follow him or her outside of angle 111. As the system tends to keep the tracking image centered on the target, it is possible for part of the tracking image to view portions of the room which are outside of the spotting image when the target is near an edge of the spotting image.

Finding the Moving Target

The requirements that only person 101 moves and that everything else in the view of spotting camera 110 be stationary, combined with the sequential-image nature of television, can be effectively utilized to develop a camera control algorithm to "lock onto" person 101.

A television moving picture is a series of static images, much like motion picture film. Each television image is made up of lines of pixels where each pixel may be in any of a range of brightness values and color values which may be represented by numbers. By way of a hueristic discussion (this is an idealized description of the process—the actual algorithm is discussed in detail below), a non-moving television camera is considered. If one television image is captured and a second image is captured shortly thereafter, and then the image information of the second is subtracted from the first, all the pixels that represent objects which did not move will be the same and their difference will be zero. Those pixels differences whose brightness or color values changed between the first and second image will have non-zero pixel differences. These pixel differences indicate both where the person was and the present location of the (moving) person 101. All pixels whose brightness and color values did not change from the first to the second image represent objects which are not apparently moving and will have pixel differences of zero.

Figure 2:
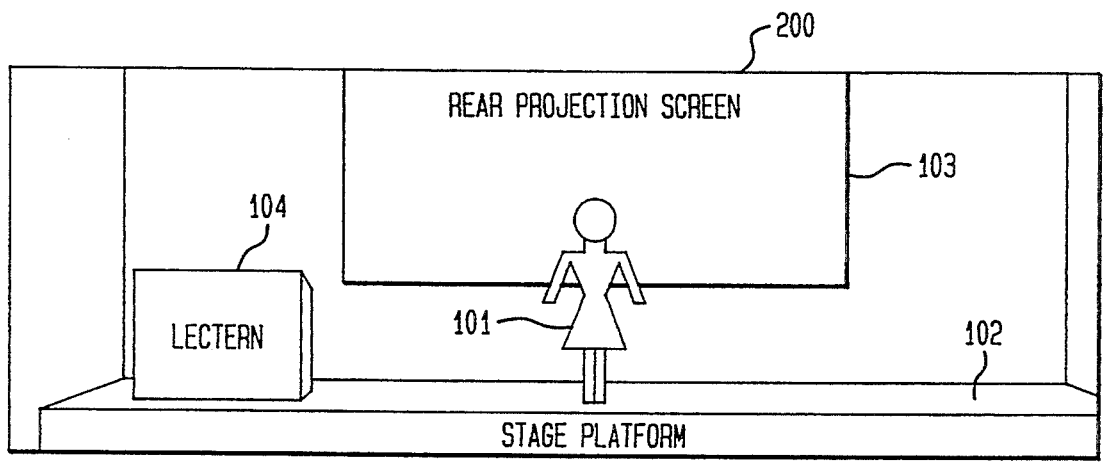
FIGS. 2–4 show, respectively, a previous image of information, a current image of information wherein there is movement by the person relative to the previous image, and a depiction of the difference between the previous and current images.
Figure 3:
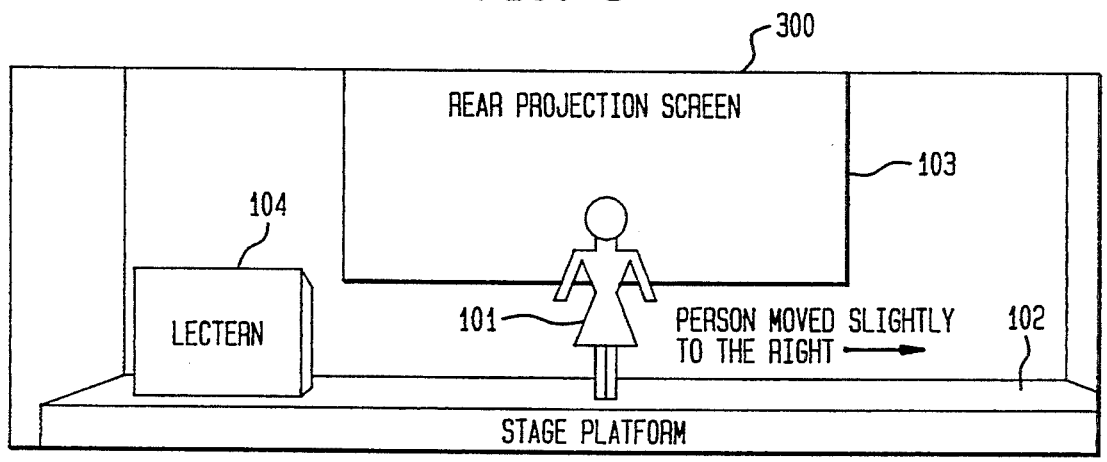
Figure 4:
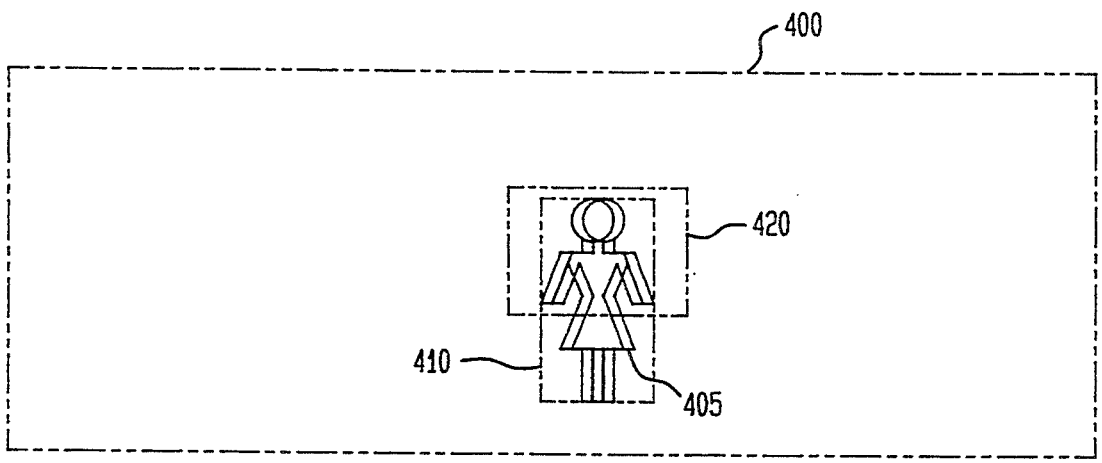

The sequence of images of FIGS. 2-4 depicts the effect. The pictorial information illustrated by spotting image 200 of FIG. 2 represents the first or "previous" spotting image, and the pictorial information illustrated by image 300 of FIG. 3 represents the second or "current" spotting image. "Difference" image 400 of FIG. 4 depicts the absolute value of the pixel differences and, since person 101 was the only object that moved, the double image 405 represents where person 101 was and is. All other objects in the spotting image did not move and the difference image does not represent them.

In practice, the double image 405 itself is not used directly. Instead, as the lines of pixels are processed and corresponding pixels are subtracted, the x and y coordinates of the highest, lowest, left-most, and right-most pixels which were non-zero are marked. These coordinates define the "Bounding Box" 410. The Bounding Box 410 represents the differences of the double image 405 and is used by the tracking algorithm to determine how much panning, tilting, and zooming of tracking camera 120 is appropriate to drive it to tracking image position 420 where it acquires a close-up picture of person 101.

Thus, based on the pixel differences of the previous spotting image 200 and the current spotting image 300 taken by spotting camera 110, tracking camera 120 captures the tracking image of person 101, as discussed in more detail below.

The mapping between the location of the Bounding Box within the difference image 400 (and hence within the current spotting image 200) and the commands sent to Pan/Tilt/Zoom/Focus subsystem (presented below) of tracking camera 120 are based on knowing the settings which aim the tracking camera 120 to predetermined locations within the viewing angle 111 of spotting camera 110. Typically these predetermined locations may be the four corners of the spotting image 200 of spotting camera 110. These settings are determined during alignment procedures accomplished during system installation. Interpolation allows for the pointing of tracking camera 120 with some accuracy at person 101.

System Architecture

Figure 5:
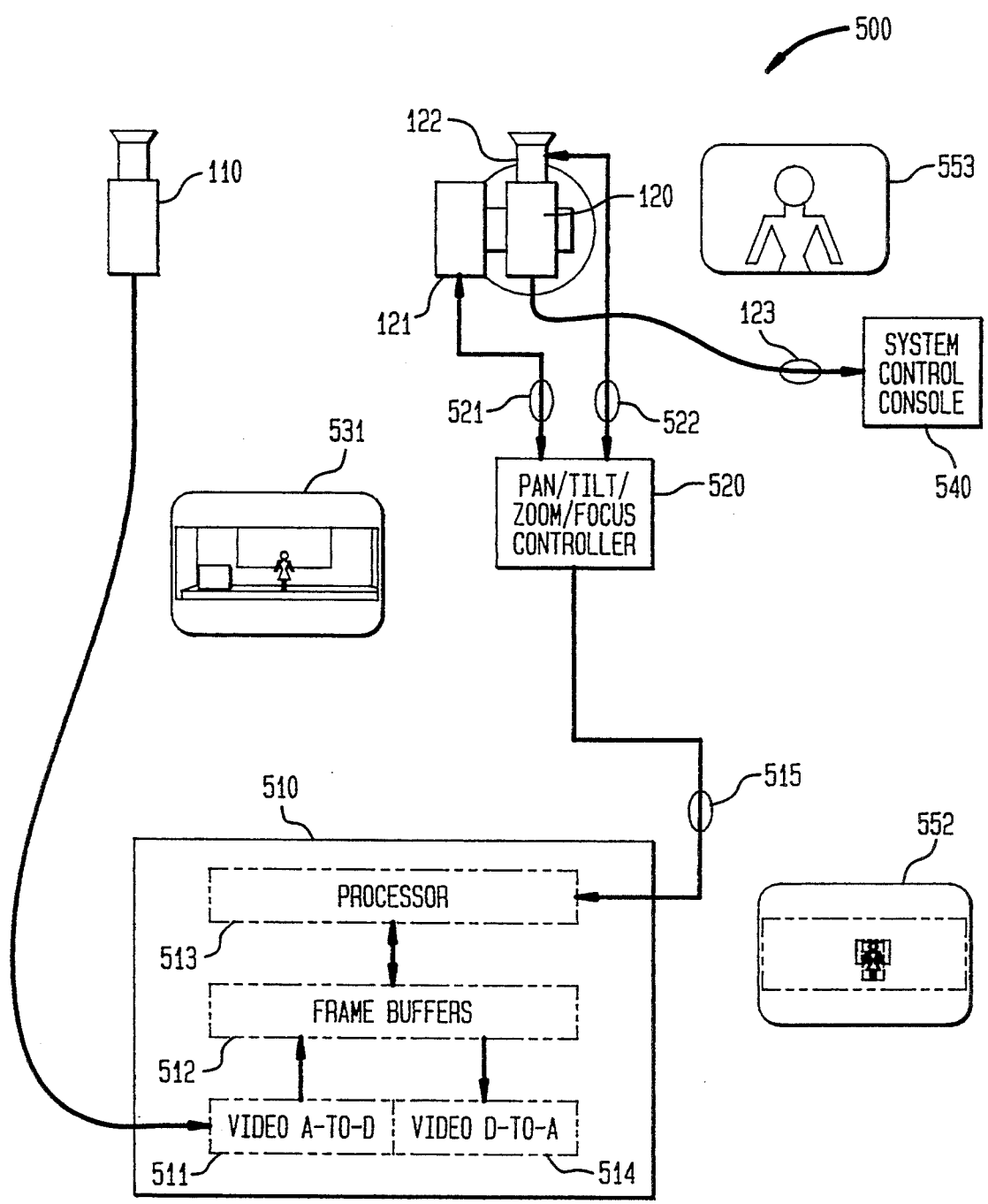
FIG. 5 depicts an illustrative system architecture in accordance with the present invention.

System architecture 500 of an illustrative embodiment in accordance with the present invention is depicted in FIG. 5, and the operation of system 500 is succinctly described as follows:

(1) Video images (an exemplary image is shown by depiction 531) from spotting camera 110 are sequentially captured by Video Analog-to-Digital (A-to-D) converter 511 in computer 510, and stored in one of the frame buffers 512.

(2) Processor 513 retrieves necessary data from a frame buffer 512, analyzes such data, and computes the action, based on a tracking algorithm discussed in detail below, to be effected by tracking camera 120.

(3) As an optional side-effect, processor 513 may develop an image displaying information related to the tracking algorithm. That image is transferred into Video Digital-to-Analog (D-to-A) converter 514 via one of the frame buffers 512 and displayed on a video monitor (not shown); such image display information is shown by depiction 552.

(4) The actions required of tracking camera 120 are communicated to Pan/Tilt/Zoom/Focus controller 520 as commands over interface bus 515. Controller 520 may sometimes respond with position data in response to the commands, and this position data is returned to processor 513 via interface bus 515.

(5) Controller 520 translates those commands into drive signals to perform the Pan/Tilt control and the Zoom/Focus control; these drive signals are transmitted to tracking camera 120 via leads 521 and 522, respectively. The signal on lead 521 is delivered to Pan/Tilt Head 121 of tracking camera 120, whereas the Zoom/Focus signal on lead 522 is delivered to Zoom/Focus subsystem 122 of tracking camera 120. The Pan/Tilt head 121 may sometimes respond with position data in response to the commands, and this position data is returned to controller 520 via leads 521. The Zoom/Focus subsystem 122 may sometimes respond with position data in response to the commands, and this position data is returned to controller 520 via leads 522.

(6) Pan/Tilt head 121 and Zoom/Focus subsystem 122 respond to these control signals, driving the tracking camera to tracking image position 420. The tracking camera 120 thus acquires a tracking image of the person 101 (depiction 553 is exemplary) which is transmitted via lead 123 for use. For example, lead 123 may go to system control console 540 where it aright become a camera image selected by the operator for display or taping purposes.

Discussion of the Operating Environment

Before the Tracking Algorithm is described in detail, aspects of the operating environment necessary to understanding the algorithm are discussed.

Figure 6:
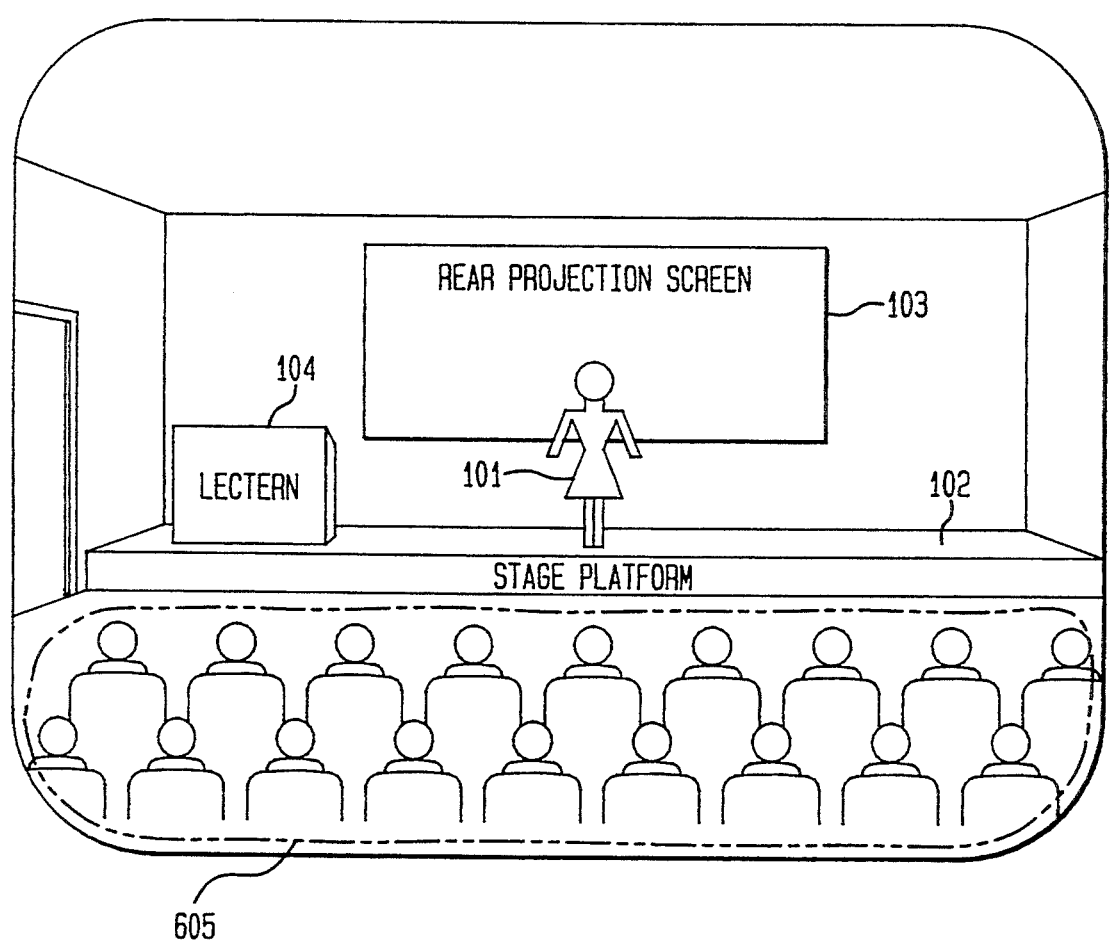
FIG. 6 depicts a typical spotting image detected by the spotting camera.

A typical image taken by spotting camera 110, designated spotting image 600, is depicted in FIG. 6. Of particular note is that members 105 of the audience in region 605 are visible within the spotting image and that person 101 can walk in front of the projection screen 103. Both people in the audience and the projection screen may present motion which should normally not be tracked.

Figure 7:
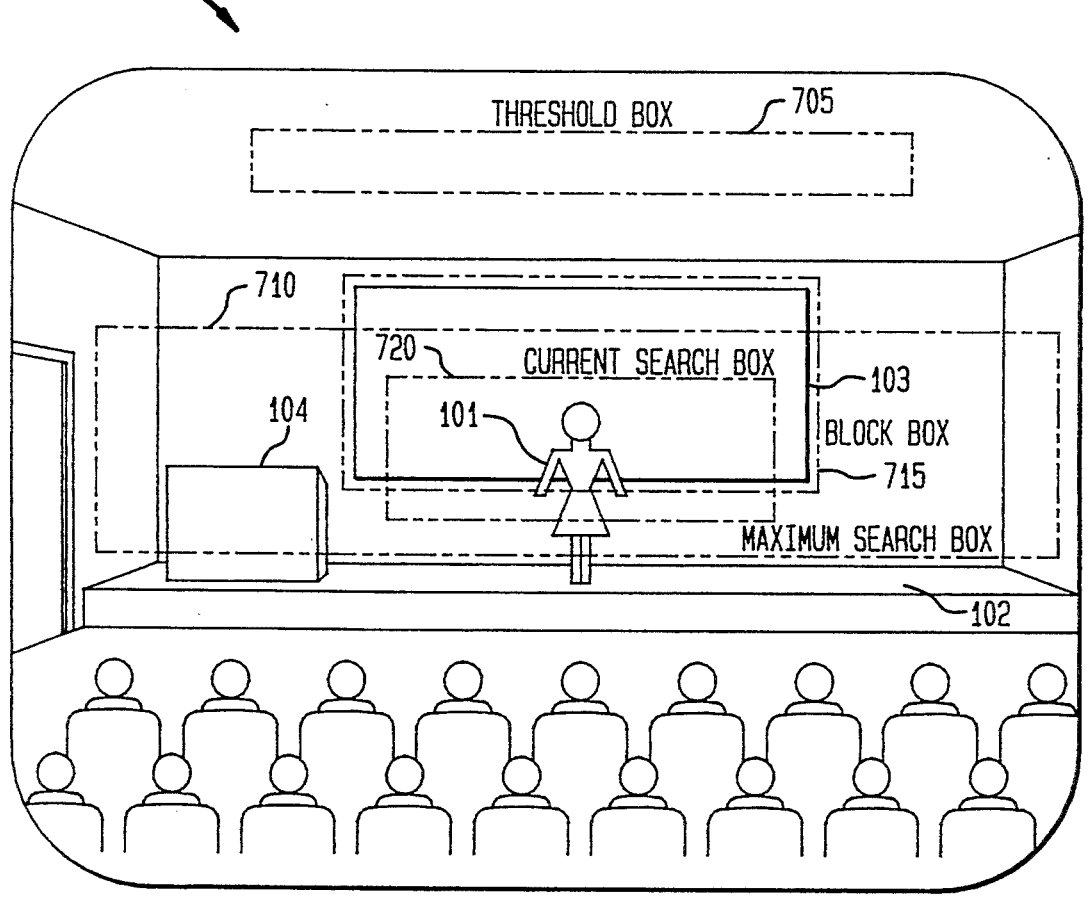
FIG. 7 depicts the typical locations of a Threshold Box, a Maximum Search Box, a Current Search Box, and a Block Box within the spotting image.

Particular areas of interest are designated within spotting image 600, called "boxes", as illustrated in FIG. 7. Specifically, the following boxes are defined: Threshold Box 705, Maximum Search Box 710, and an optional Block Box 715. Each box is defined to the tracking algorithm after spotting camera 110 is installed in the room and remains constant. Defining the boxes is only required once in most installations. In situations where the system must deal with very different environments, such as where the same room has radically different setups and uses, it will be necessary to define several sets of boxes and select the appropriate set for each use. Some uses may require no Block Box 715; others may require more than one Block Box 715.

Threshold Box 705 is placed so that it covers an area of the image which is unlikely to see motion, such as the ceiling of the room. The area within Threshold Box 705 should be illuminated to approximately the same extent as the area within the Maximum Search Box 710.

Maximum Search Box 710 defines the maximum area within the spotting image 600 where control system 109 will attempt to discern motion. Things and people which are likely to move and are not to be tracked, such as members of the audience, should not be within the Maximum Search Box. In FIG. 7, Maximum Search Box 710 is sized from about knee-height of person 101 to as high as the tallest person might reach. The bottom of Maximum Search Box 710 is well above the heads of the audience, so that the heads and raised hands of the audience are unlikely to be within Maximum Search Box 710.

Within the Maximum Search Box 710 is the Current Search Box 720. The Current Search Box is the area within which Pixel Differences are computed and changes in size as the algorithm runs, as described below. It is never larger than the Maximum Search Box 710.

Block Box 715 defines an area at least partially within the Maximum Search Box 710 where there is likely to be motion which is usually, but not always, ignored. For example, when person 101 changes slides by pushing a button on lectern 104, then changes in the images on projection screen 103 are within Maximum Search Box 710 and therefore would be seen as motion. It is preferable if such motion is not misinterpreted as being the person moving. The algorithm ignores motion within Block Box 715, except when other motion within the Current Search Box is adjacent to it, as described below.

In this illustrative embodiment, each of these boxes is rectangular and there is only one of each. In general, the shape of each area could be arbitrary and there could be multiple instances of each of these within spotting image 600.

Details about the roles of these boxes 705, 710, 715, and 720 will be discussed during the elucidation of the Tracking Algorithm.

The Tracking Algorithm

In order to describe the algorithm concisely, the following terms are defined:

Scan Line Length—the number of pixels in an image scan line.

Pixel Value—the luminance (brightness) and color values of each pixel in the spotting image. Typically luminance values range from zero (representing black) through the maximum pixel value (representing white). A typical maximum luminance pixel value is 255. (The illustrative embodiment does not elucidate use of color information; however, the algorithm may use use color information if it is available.)

Pixel Difference—the absolute value of the difference between two Pixel Values at the same location between the Current Image and the Previous Image.

Rectangle—a rectangular area of the spotting image, defined by the xmin, xmax, ymin, ymax coordinates from the video image wherein: 'x' corresponds to the number of the pixels across a scan line with xmin on the left, xmax on the right; and 'y' corresponds to the number of the scan lines with ymin at the top, ymax at the bottom.

Difference Count—the number of pixels within a Rectangle with Pixel Differences above the Current Threshold.

Bounding Box—the minimum sized Rectangle containing all the pixels with Pixel Differences which are above the Current Threshold.

Sub-Bounding Box—A Bounding Box separated from another Bounding Box; such as a Sub-Bounding Box totally within a Block Box and another Sub-Bounding Box totally outside the same Block Box.

Maximum Search Box—the Rectangle defining the maximum area within the Spotting Image wherein motion is sought.

Current Search Box—a Rectangle, no larger than the Maximum Search Box and no smaller then the Camera Frame, wherein movement by the object is being searched.

Threshold Box—a Rectangle within the Spotting Image wherein motion is most unlikely; used in determining Current Noise Level.

Current Image—the copy of the lastest digitized spotting camera image stored by processor 513.

Previous Images—copies of earlier, retained digitized spotting camera images stored by processor 513.

Current Noise Level—the largest Pixel Difference in the Threshold Box between the Current Image and the most recent Previous Image.

Threshold Bias—a quantity added to the Current Noise Level as measured within the Threshold Box to obtain the Current Threshold.

Current Threshold—the sum of the Current Noise Level and the Threshold Bias.

Tracking Frame—a Rectangle with the aspect ratio of tracking camera image to which an ideal tracking camera would theoretically be driven.

Camera Frame—a Rectangle with the aspect ratio of tracking camera image to which tracking camera 120 is actually driven. Ideally, the algorithm should drive the tracking camera 120 so that it images all of the Camera Frame and no more.

Confidence Measure—a numerical quantity used as an indication of how much the algorithm believes the current Bounding Box represents the current position of the target being followed. Typically a value between 0 and 100.

Minimum Confidence Level—the Confidence Measure at which Previous Images used in the algorithm may be discarded.

Extra Width Percentage—the fixed percentage added to the width and height of the Tracking Frame to create the Camera Frame.

The following steps determine the initial settings of the Tracking Algorithm and are typically done at system installation.

(a) Mount, align and adjust spotting camera 110 so spotting image 700 images at least the entire area where tracking camera 120 should track person 101.

(b) Mount, align and adjust tracking camera 120 and its pan/tilt head 121 so that they can image all areas of spotting image 700 at the maximum telephoto (greatest magnification) zoom. The algorithm performs best when the lenses of spotting camera 110 and tracking camera 120 are as close to each other as possible. Typical installation places the vertical lens axes so they are coplanar and minimum possible displacement between the horizontal lens axes.

(c) Define Threshold Box 705 to the algorithm.

(d) Define Maximum Search Box 710 to the algorithm.

(e) Define optional Block Boxes 715 to the algorithm.

(f) Define the correspondence between extreme points within spotting image 700, for instance, the four corners, and the pan/flit commands sent by processor 513 to the Pan/Tilt/Zoom/Focus controller 520 to point the center of tracking camera 120 image at the corners.

(g) Define the correspondence between the Zoom commands sent by the processor 513 to the Pan/Tilt/Zoom/Focus controller 520 to zoom to the extremes of magnification (maximum wide angle and maximum telephoto image) and the corresponding Camera Frames. Typically this alignment is done with the Camera Frames at the center of the spotting image.

(h) Define the system parameters:
  (i) Threshold Bias, typically 10% of the maximum Pixel Value.
  (ii) Minimum Confidence level, typically 30.
  (iii) Extra Width Percentage, typically 100.

Figure 8:
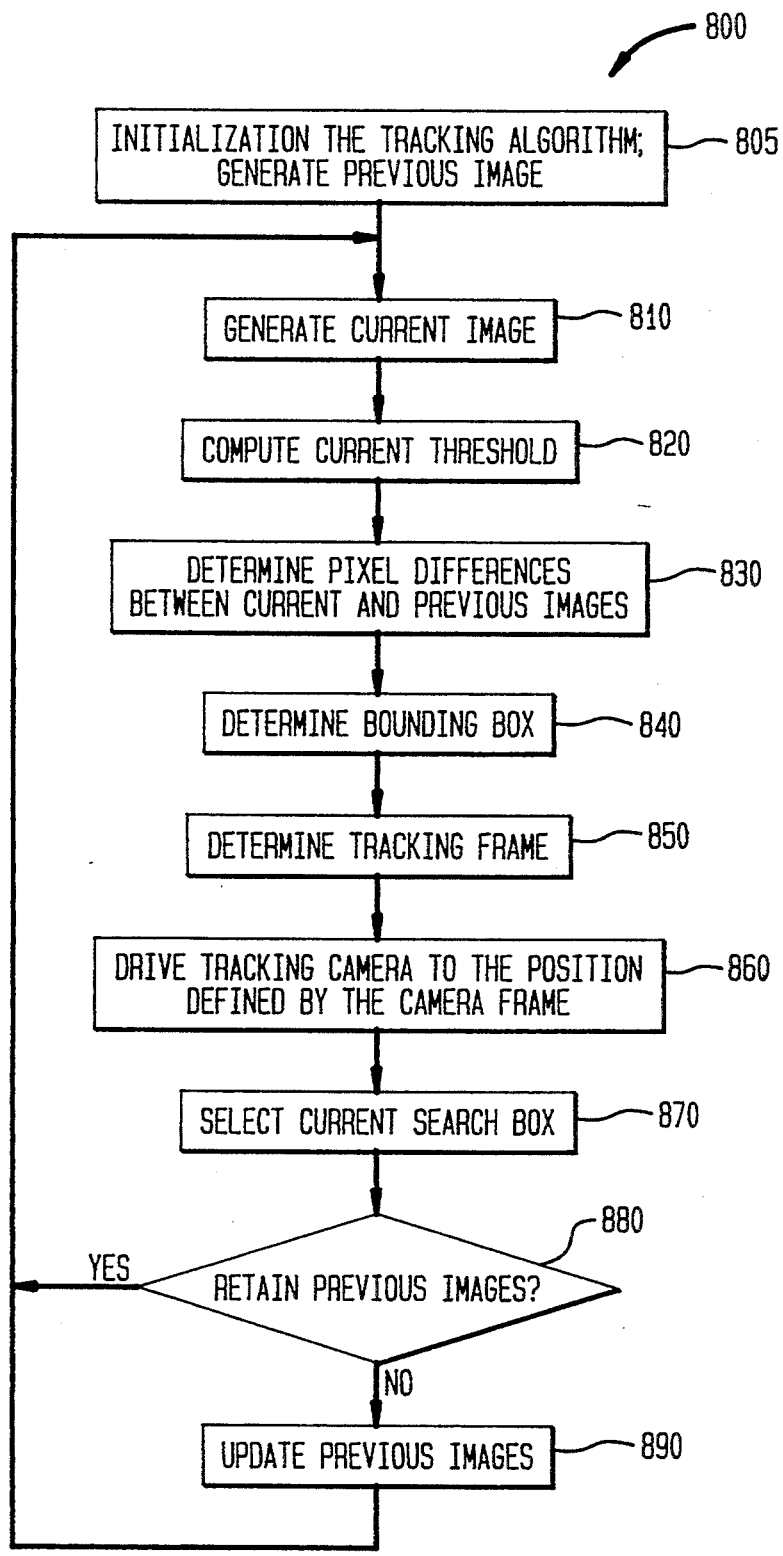
FIG. 8 depicts a flow diagram of the tracking algorithm in accordance with the present invention.

The tracking algorithm is comprised of a loop having the steps discussed in detail below with reference to flow diagram 800 in FIG. 8. For each step of the tracking algorithm, the intent of that step is first described and then the processes which accomplish it are discussed.

In the following steps, "Digitizing a spotting image" implies:

(a) Digitize an image from spotting camera 110 and store in digitized format in a frame buffer 512.

(b) Copy this initial digitized image from a frame buffer 512 into the memory of processor 513.

Processing Block 805: Initialize the Tracking Algorithm; Generate Previous Image.

Accomplishes the following:

(a) Set the Current Search Box 720 to the values for the Maximum Search box 710.

(b) Digitize a spotting image as the Previous Image.

These steps ensure that the algorithm is initialized with appropriate values and the processor 513 has at least one Previous Image within its memory to use in the remainder of the algorithm.

Processing Block 810: Generate Current Image.

Digitize a spotting image as the Current Image.

This step is required in order to have an image within the memory of processor 513 to compare with the Previous Image.

Processing Block 820: Compute Current Threshold.

The Pixel Difference is a combination of actual image differences due to objects moving and video noise. The video noise may be contributed several sources, typically including:

(a) noise in the imaging detector within spotting camera 110, (b) noise in the imaging circuitry within spotting camera 110, and (c) noise in video Analog-to-Digital circuitry 511.

If not accounted for, video noise could cause Pixel Differences which would appear to the algorithm as object motion. By calculating a Current Threshold which is higher that the contribution of video noise to the Pixel Differences the algorithm can avoid mistakingly identifying video noise as motion.

As part of the setup procedure, a box in the image of spotting camera 110 is picked as the Threshold Box 705. This box is in a portion of the spotting image 700 of camera 110 which is illuminated approximately the same as the Maximum Search Box 710 but which is never expected to see motion. Therefore, any Pixel Differences within the presumedly static region encompassed by the Threshold Box can be assumed to be due to video noise only. This video noise is assumed to be representative of the video noise which occurs within the Maximum Search Box. The Current Threshold is set as a function of this video noise.

For each pixel within the Threshold Box 710, calculate the Pixel Difference between the Current Image and the Previous Image. The largest value found is the Current Noise Level. Set the Current Threshold as the Current Noise Level plus the Threshold Bias.

Processing Block 830: Determine Pixel Differences Between Current and Previous Images.

Creating a double image 405 which is a good indication of where a person 101 is now depends on that person having moved recent enough and far enough for the difference between a Previous Image and the Current Image to create a representative Bounding Box 410. A means to strengthen that difference is to keep several Previous Images, by increasing age relative to the Current Image. If a strong difference occurs between the newest Previous Image and the Current Image, that is an indication that there is a lot of recent motion and is sufficient to continue with this step. If that recent difference shows only slight motion, such as when the person is moving slowly or only moving one portion of their body, comparison between the next oldest Previous Image and the Current Image will create a double image 405 which will show the motion that has occurred over a longer period of time and hence may present a stronger difference on which to base the rest of the algorithm.

Figure 9:
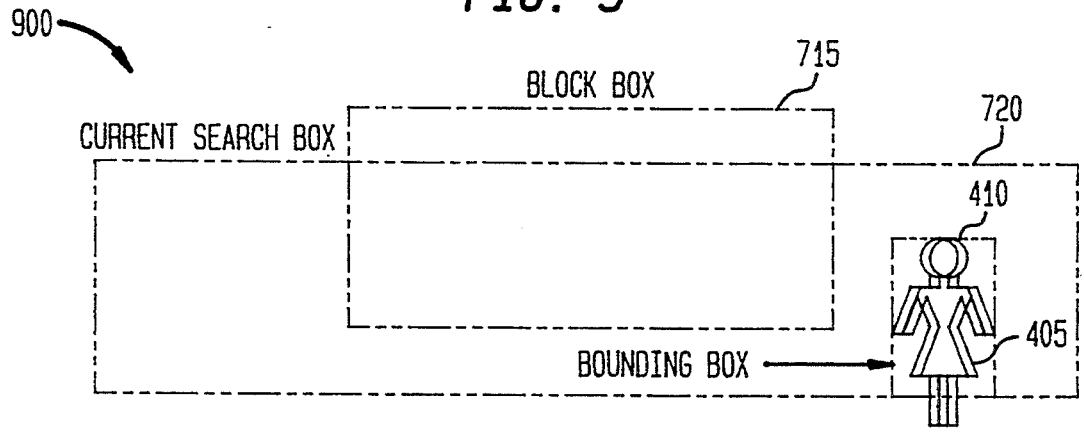
FIG. 9 depicts the occurrence of a Bounding Box appearing totally within the Current Search Box and outside any Block Box.

When the person moves in an area only within the Current Search Box, away from any Block Boxes 715, the Bounding Box 410 is defined by the Pixel Differences of his or her double image 405 within the Current Search Box 720. FIG. 9 illustrates this effect, that is, Bounding Box 410 is totally within Current Search Box 720 and totally outside any Block Box 715.

Figure 10:
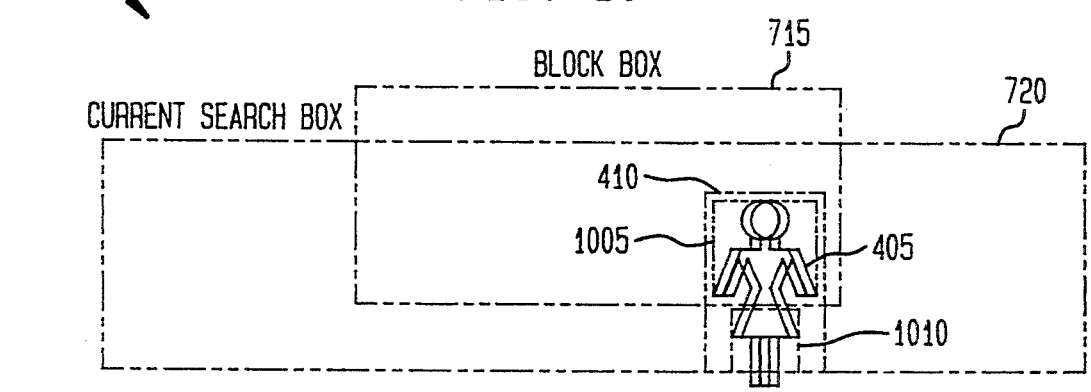
FIG. 10 depicts the occurrence of adjacent Sub-Bounding Boxes, one within a Block Box and the other within the Current Search Box but outside any Block Box.

But when person 101 walks in front of projection screen 103, as depicted in FIG. 10, the portion of the double image 405 within the Block Box 715 cannot be ignored. When there is a Sub-Bounding Box 1005 within Block Box 715 and a Sub-Bounding Box 1010 outside the same Block Box 715, and they are adjacent to each other, the two are merged creating the composite Bounding Box 410 used for tracking.

Figure 11:
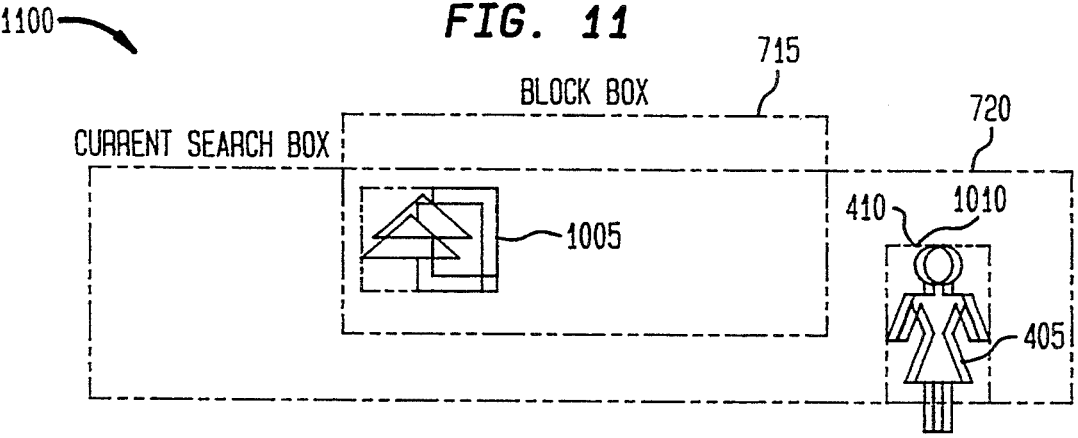
FIG. 11 depicts the occurrence of spaced-apart Sub-Bounding Boxes one within a Block Box and the other within the Current Search Box but outside any Block Box.

If there is a significant distance between the two Sub-Bounding Boxes, as depicted by FIG. 11, such as when changing the slide generates Sub-Bounding Box 1005 in the Block Box in addition to Sub-Bounding Box 1010 in the outside the same Block Box 715, Sub-Bounding Box 1010 becomes the Bounding Box 410 used for tracking.

Within the Current Search Box 720, calculate the Pixel Difference of the Current Image and the corresponding Previous Image. If the Pixel Difference is greater than the Current Threshold, continue with the following steps:

a. If the pixel is within Block Box 715, record the minimum xmin and ymin and the maximum xmax and ymax pixel coordinates and add one to the count of pixels found above the Current Threshold within that Sub-Bounding Box 1005.

b. Otherwise, record the minimum xmin and ymin and the maximum xmax and ymax pixel coordinates and add one to the count of pixels found above the Current Threshold within that Sub-Bounding Box 1010.

Processing Block 840: Determine Bounding Box.

If Sub-Bounding Boxes are found within the Current Search Box and the Block Box, it is now necessary to determine if they should be combined. If the Sub-Bounding Box within the Current Search Box is "near" the Sub-Bounding Box within the Block Box, combine both Sub-Bounding Boxes to form a composite Bounding Box. Otherwise, ignore the Bounding Box in the Block Box. Typically, Sub-Bounding Boxes are considered "near each other" if the number of pixels separating the edges of the Sub-Bounding Boxes are within 1% of the Scan Line Length.

Processing Block 850: Determine the Tracking Frame.

Typically, the aspect ratio of the tracking camera image is 4-wide to 3-high. Since a person does not match the 4:3 aspect ratio, a compromise is required when capturing his or her image.

Figure 12:
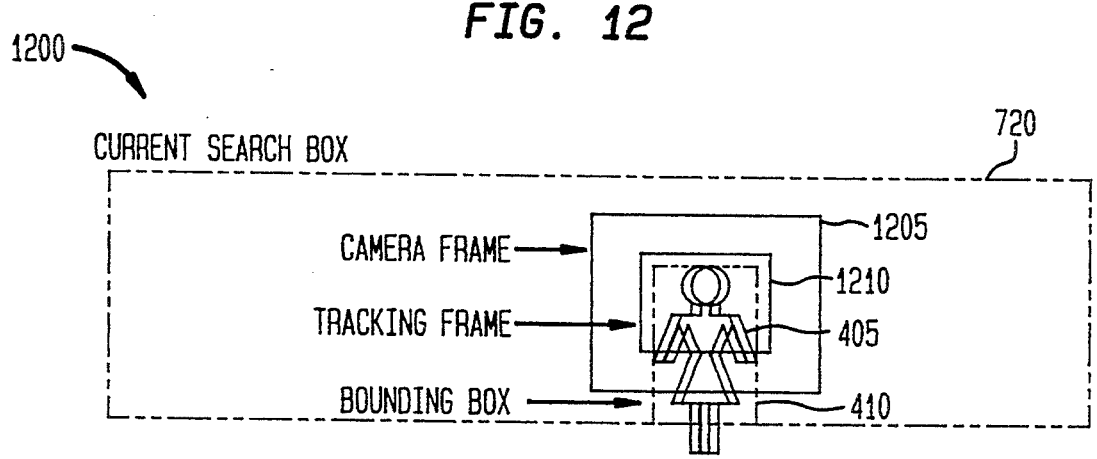
FIG. 12 depicts the arrangement of the Current Search Box, the Tracking Frame, and the Camera Frame.

Note that in the operating environment being addressed, the head of person 101 is more appropriate to display than his or her feet. A reasonable compromise is to position the top of the Tracking Frame 1210 proximate to the top of the Bounding Box (which usually corresponds to the top of the person's head) and make the Tracking Frame as wide as the Bounding Box, as depicted in FIG. 12.

However, because the algorithm is tracking the difference in the person's position and not the outline of the person, the Bounding Box does not uniformly surround the person's image. The algorithm smooths the size and position of Tracking Frame 1210 to help keep the tracking camera 120 from "jumping around". Many algorithms may be readily devised by those with skill in the art, such as averaging, for smoothing the position of the Tracking Frame. The intent of smoothing the Tracking Frame is to both keep it positioned on person 101, appropriately sized, and to respond quickly when the person moves. The smoothing algorithm may also choose to enlarge the Tracking Frame when the person moves around frequently within a relatively confined area so that the person is always seen in the tracking camera image without moving the tracking camera. Later, if the person stops moving so frequently, the algorithm may choose to shrink the Tracking Frame to create a close-up image. Accordingly, the algorithm is then used to:

Compute the smoothed y position of the top of the Bounding Box. Use the smoothed y as the top of Tracking Frame;

Compute the smoothed width of the Bounding Box. Use the smoothed width as the width of the Tracking Frame; and Compute the smoothed x position of the center of the Bounding Box. Use the smoothed x as the desired horizontal center of the Tracking Frame.

As part of the smoothing, calculate a Confidence Measure of the difference for use later. This Confidence Measure may based on the number of Pixel Differences that are above the Current Threshold within the Bounding Box. The Confidence Measure may take into account the recent history of the Pixel Differences. If there is a sudden, large increase in the number of Pixel Differences it is likely to be due to an event which is not a person moving, such as a change in room lighting. The Confidence Measure discounts such large changes unless they persist.

Likewise, a very small number of Pixel Differences after a persistent recent history of relatively large numbers of Pixel Differences is likely to be less important and is also discounted, unless they persist for a time.

Processing Block 860: Drive Tracking Camera to the position defined by the Camera Frame.

Even with the smoothing described in Processing Block 850, too many fine adjustments to tracking camera 120 image may become a distraction to those watching. As depicted by FIG. 12, hysteresis is introduced by selectively adding a fixed percentage (the Extra Width Percentage, typically 100%), to the width and height of the Tracking Frame 1210, creating Camera Frame 1205. Pan/Tilt head 121 and Zoom/Focus subsystem 122 are driven to capture Camera Frame 1205 with tracking camera 120.

Most motions of the Tracking Frame which do not take it outside the Camera Frame do not cause the Camera Frame to move. Motions of the Tracking Frame which do take it outside the Camera Frame cause the Camera Frame to move and hence the Pan/Tilt Head 121 will be moved to point the tracking camera 120 appropriately (see below).

When the Tracking Frame changes size so that the Camera Frame is no longer the fixed percentage bigger than the Tracking Frame, the Camera Frame is adjusted in size to make it conform and hence the zoom lens of the Zoom/Focus subsystem 122 will be adjusted to change the magnification of the image captured by the tracking camera 120 appropriately (see below).

Once the pan, tilt and zoom settings are determined, they are sent to the Pan/Tilt/Zoom/Focus controller 520 which in turn causes the tracking camera 120 to respond appropriately.

When tracking camera 120 and person 101 are both moving, the current automatic focus technology often has difficulty getting a correct setting. Automatic focusing of tracking camera 120 has been much more successful when activated only after tracking camera 120 has stopped moving. Thus, if Camera Frame 1205 has been moving and has now stopped and not moved for a short while (typically, a second or two), processor 513 sends an AutoFocus command to the Zoom/Focus subsystem 122 via the Pan/Tilt/Zoom/Focus controller 520.

Processing Block 870: Select the Current Search Box.

When the algorithm has a clear indication of where the person is, the assumption is made that this is the person of interest and there is no need to look anywhere else. Under this condition, the algorithm ignores other motions within the Maximum Search Box but distant from the person by shrinking the Current Search Box to closely surround the person as long as it keeps seeing the person moving. If there is no motion, the algorithm enlarges the Current Search Box looking for motion.

Figure 13:
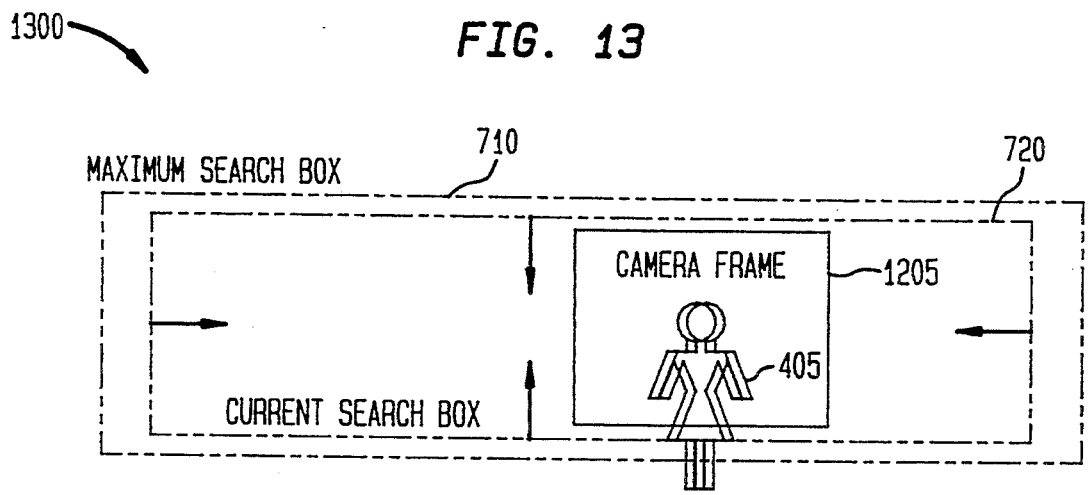
FIGS. 13 and 14 depict the direction of movement for the edges of the Current Search Box relative to the Camera Frame and Maximum Search Box for the cases of a high Confidence Measure and low Confidence Measure, respectively, as to the location of the person.
Figure 14:
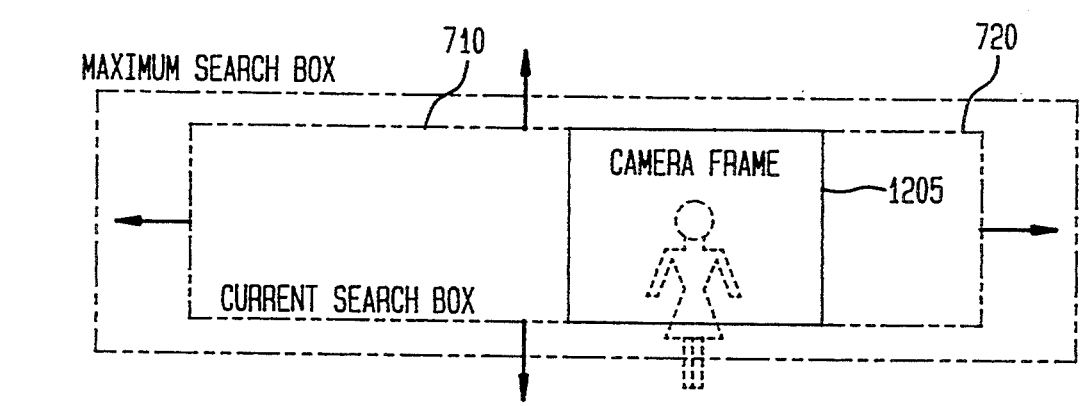

If there are Pixel Differences above the Current Threshold, the edges of the Current Search Box are moved toward the Camera Frame in steps (typically, 5% of the Scan Line Length), as depicted in FIG. 13; otherwise, the edges are moved toward the Maximum Search Box in steps, as illustrated in FIG. 14.

The size of the steps with which the Current Search Box moves toward the Camera Frame and toward the Maximum Search Box need not be the same and may be installation dependent.

Processing Block 880: Decide Whether or not to Retain the Previous Images.

The algorithm relies on the image-to-image difference providing enough motion to give a good idea of the person's position. The Confidence Measure expresses the algorithm's assessment of how strongly the algorithm believes it knows the person's current position. If the person is not moving much, the difference may not be very representative of a person and the Confidence Measure would be low. One way to increase the likelihood that there will be significant motion between images and a higher Confidence Measure is to wait longer between Images, increasing the time interval between the Previous Images and the Current Image.

In the illustrative embodiment of the invention, the Confidence Measure is based on the Difference Count within the Bounding Box relative to the Difference Counts seen in recent cycles of the algorithm. Other embodiments of the Confidence Measure are also possible.

If the Confidence Measure is lower than the Minimum Confidence Measure the decision is then made to retain the Previous Images. If the Previous Image is retained, then the process continues at Processing Block 810. If the Previous Image is not retained, then the process continues at Processing Block 890.

Also, if the Previous Images are retained for a long period of time, the high Confidence Measure may be due to having a Previous Image which contains a person within the Current Search Box and a Current Image which does not contain a person within the Current Search Box. (This could be the result of a person completely leaving the Current Search Box within the time between the capturing of the Previous Images and Current Image.) For this reason, if the Previous Images have not been updated for a long time, typically 10 seconds, the answer is set to "No" and the process continues at Processing Block 890.

Processing Block 890: Update Previous Images.

As seen in Processing Block 830, there may be more than one Previous Image. To update the Previous Images, discard the oldest Previous Image and make the next oldest Image the oldest previous image, and similarly until the Current Image is the most recent Previous Image.

It is to be understood that the above-described embodiments are simply illustrative of the principles in accordance with the present invention. Other embodiments may be readily devised by those skilled in the art which may embody the principles in spirit and scope. Thus, it is to be further understood that the circuit arrangements and concomitant methods described herein are not limited to the specific forms shown by way of illustration, but may assume other embodiments limited only by the scope of the appended claims.

What is claimed is:

1. A method for automatically following a person moving within the view of an electronic camera system comprising a spotting camera and a tracking camera for capturing the picture of the moving person for viewing, the method comprising the steps of:

generating and storing, as a previous image, the image of the person captured by the spotting camera during a scan interval, generating and storing, as a current image, the image of the person captured by the spotting camera during a scan interval, determining a threshold box within the field of view of the spotting camera to provide a current threshold value representative of background noise conditions, determining a current search box from the image captured by the spotting camera to locate the moving person, determining pixel differences within the current search box between the current image of the person and the previous image, said pixel differences being computed with reference to the current threshold value, determining a bounding box within the current search box from the pixel differences, the size and position of the bounding box being indicative of the movement detected between the current image of the person and the previous image, generating a tracking frame with reference to the bounding box, the tracking frame being indicative of the location of the moving person within the view of the spotting camera, smoothing the size and position of the tracking frame depending on the size and position of the bounding box, determining a camera frame from the tracking frame and driving the tracking camera to the camera frame, and adjusting the size of the current search box to closely surround the person as long as the person is moving and to be enlarged when there is no motion by the person.

2. The method in accordance with claim 1 wherein said smoothing step includes calculating a confidence measure based on the number of pixel differences that are above a current threshold within the bounding box and said method further comprising the steps of:

repeating the steps of the method starting with storing the current image of the person as the previous image if the confidence measure is above a minimum measure, and repeating the steps of the method starting with the previously stored image if the confidence measure is below said minimum measure.

* * * * *